United States Patent [19]

Moorey

[11] 3,975,663
[45] Aug. 17, 1976

[54] METHOD OF AND APPARATUS FOR DETECTING GROUND FAULTS IN ELECTRICAL SYSTEMS

[75] Inventor: Ernest J. Moorey, Devon, England

[73] Assignee: Western Industries (Proprietary) Ltd., Johannesburg, South Africa

[22] Filed: Jan. 10, 1975

[21] Appl. No.: 540,083

Related U.S. Application Data

[63] Continuation-in-part of Ser. No. 368,071, June 8, 1973, abandoned.

[30] Foreign Application Priority Data

June 13, 1972 South Africa............ 72/4072
June 13, 1972 South Africa............ 72/4073

[52] U.S. Cl. ............ 317/18 R; 317/27 R; 324/51; 340/255
[51] Int. Cl.² ............ H02H 3/16
[58] Field of Search ............ 317/18 D, 27 R, 18 R, 317/33 SC; 324/51, 52; 328/146, 147, 149; 340/255, 256; 307/94, 235, 313, 232

[56] References Cited
UNITED STATES PATENTS

| | | | |
|---|---|---|---|
| 3,066,284 | 11/1962 | McKinley et al. | 340/255 |
| 3,666,993 | 5/1972 | Legatti | 317/27 R X |
| 3,699,392 | 10/1972 | Lee et al. | 340/255 X |
| 3,754,221 | 8/1973 | Stelter | 317/18 D X |
| 3,757,169 | 9/1973 | Beresnikow | 317/27 R X |
| 3,868,665 | 2/1975 | Treglown | 340/255 |

Primary Examiner—J D Miller
Assistant Examiner—Patrick R. Salce
Attorney, Agent, or Firm—Berman, Aisenberg & Platt

[57] ABSTRACT

A method of detecting ground faults in ungrounded equipment having an electrical supply. The method comprises the steps of:
  connecting either side of the supply to a chassis ground terminal of the equipment;
  impressing a voltage varying alternately between two predetermined values on the terminal relative to one side of the supply;
  detecting and monitoring, with respect to this side of the supply, the resulting potential between this side the chassis ground, said potential varying between predetermined magnitudes in the absence of any ground leak;
  monitoring said potential, ground faults in the equipment being detectable by a change in magnitude of said varying potential, establishing ground faults by changes in the magnitude of the varying potential and
  locating the faults with respect to the sides of the supply from variations to the upper and lower predetermined values.

Preferably the limits to the voltage will be a predetermined value and substantially zero.

11 Claims, 6 Drawing Figures

METHOD OF AND APPARATUS FOR DETECTING GROUND FAULTS IN ELECTRICAL SYSTEMS

CROSS REFERENCE TO RELATED APPLICATION

This application is a continuation-in-part of U.S. application Ser. No. 368,071, filed June 8, 1973, and now abandoned.

BACKGROUND OF THE INVENTION

The invention relates to a method of and apparatus for detecting ground faults in floating, i.e. ungrounded, electrical systems.

Ground fault detective apparatus must be capable of detecting not only faults on one or the other side of an electrical system, but also faults occurring simultaneously on both sides of the system. If such faults are more or less equally balanced, the difficulty of detecting the faults increases.

One prior art method of detecting balanced ground faults known to me is described in U.S. Pat. No. 3,754,221. The method comprises the location of a fault in one side of a circuit by connecting a resistance of known value to the opposite side of the circuit, grounding such resistance through a voltage detector and determining the voltage drop. More specifically, the method comprises repeating the above step alternately for opposite sides of the circuit to provide a measurement of faults in both sides of the circuit.

The present invention proposes a novel approach and solution to the problem outlined above.

According to the present invention a method of detecting ground faults in ungrounded equipment having an electrical supply comprises the steps of;

connecting either side of the supply to a chassis ground terminal of the equipment;

impressing a voltage varying alternately between two predetermined values on the terminal relative to one side of the supply;

detecting and monitoring, with respect to this side of the supply, the resulting potential between this side and the chassis ground, said potential varying between predetermined magnitudes in the absence of any ground leak, and monitoring said potential, ground faults in the equipment being detectable by a change in magnitude of said varying potential, establishing ground faults by changes in the magnitude of the varying potential and locating the faults with respect to the sides of the supply from variations to the upper and lower predetermined values.

In one form of the invention a predetermined value and substantially nil constitute the two values of voltage impressed on the chassis ground terminal.

Other aspects of the invention will become apparent from the following description of the apparatus and method according to the invention which is made by way of example only and with reference to the accompanying drawings.

DESCRIPTION OF PREFERRED EMBODIMENTS

Figure 1:
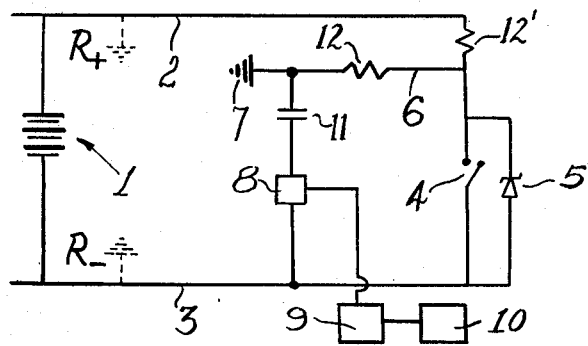
FIGS. 1 and 6 are schematic circuit diagrams of ground fault detectors according to the invention in simple form

Referring to FIG. 1, a battery 1 is the station battery of a floating electrical system (not shown) which is to be monitored for ground faults.

Conductors 2, 3 are connected to the positive and negative sides respectively of the station battery 1. The conductors 2, 3 are connected to a switch 4. A Zenerdiode 5 is connected in parallel with the switch. A conductor 6 is connected to the conductor 2 and to the chassis ground terminal 7 of the electrical system to be monitored. A voltage detector 8 and capacitor 11 are connected in series between the conductors 3, 6. The voltage detector is connected to a voltage monitoring device 9 and the latter is connected to a relay 10. Conductor 6 includes a resistor 12 and conductor 2 includes a resistor 12'.

In use, the switch 4 is opened and closed alternately. When it is open, a potential difference arises between the ground terminal 7 and the negative side of the battery 1. The magnitude of this potential difference is determined by the Zener diode 5. When the switch 4 is closed, the above potential difference falls to nearly nil. Resistor 12' limits the current through Zener diode 5.

It will be understood that the Zener diode 5 provides a means of impressing a voltage on the ground terminal 7 relative to the negative side of the battery 1, the voltage being derived from the station battery 1. The switch 4 provides a means for varying the voltage between two predetermined values. As stated, these values in this embodiment of the invention constitute a predetermined value and nearly nil.

The voltage detector 8 serves to detect the potential difference between the ground terminal 7 and the negative side of the battery 1. In the absence of any ground faults, the potential varies in the form of a square wave as described above.

If a ground fault occurs on the negative side of the system being monitored (indicated as R— in FIG. 1 for ease of reference) a resistor is in effect connected between the ground terminal 7 and the negative side of the battery 1.

Thus, when the switch 4 is opened, the potential of the ground terminal 7 with respect to the negative side of the battery will not rise to the Zener diode 5 voltage. This is caused by the leak current in conductor 6 and the accompanying voltage drop over resistor 12.

The drop in potential between the ground terminal 7 and the negative side is reflected in the output signal of the voltage detector 8 and as a result the voltage monitoring device 9 will cause the relay 10 to drop. The relay may in turn disconnect the battery from the system which it supplies.

If a ground fault occurs on the positive side of the system being monitored (indicated as R+ in FIG. 1 for ease of reference) a resistor is in effect connected between the ground terminal 7 and the positive side of the battery 1. Thus, when the switch 4 is closed, the potential of the ground terminal 7 with respect to the negative side of the battery will not fall to nil as a result of the leak current in conductor 6 and the relay will once again drop.

If a balanced fault occurs, it is detected in exactly the same way as described above.

It will be appreciated that the voltage impressed on the ground terminal of the system being monitored may be varied between any two predetermined values.

FIGS. 2 to 5 are circuit diagrams of an example of a detector as it may appear in practice and utilizing the principle of operation described above. Like numerals in FIG. 1 and in FIGS. 2 to 5 represent like parts.

Figure 2:
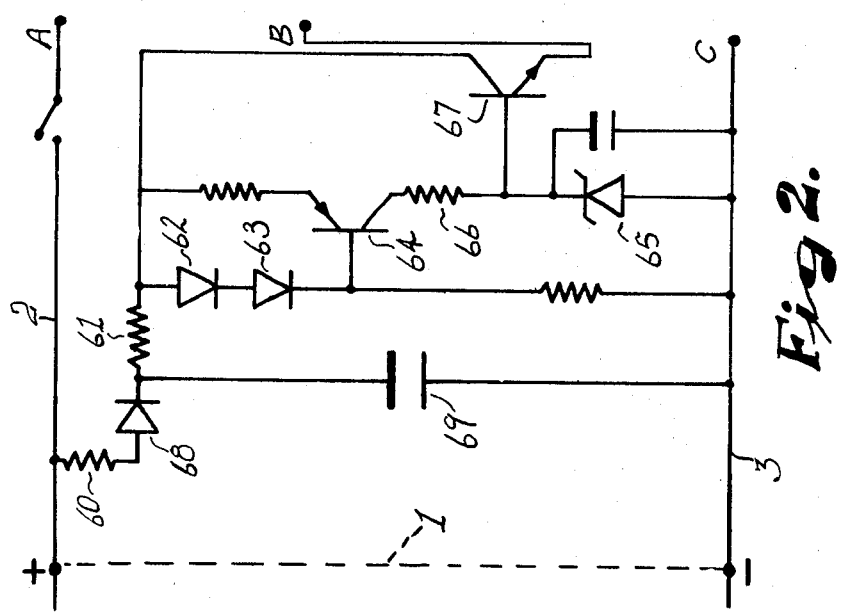
FIGS. 2 to 5 are circuit diagrams of the detector of FIG. 1 as it may appear in partice. The circuit of FIG. 2 joins that of FIG. 3 at points A, B, C and the circuit of FIG. 3 joins that of FIG. 4 at points D, F, G.
Figure 5:
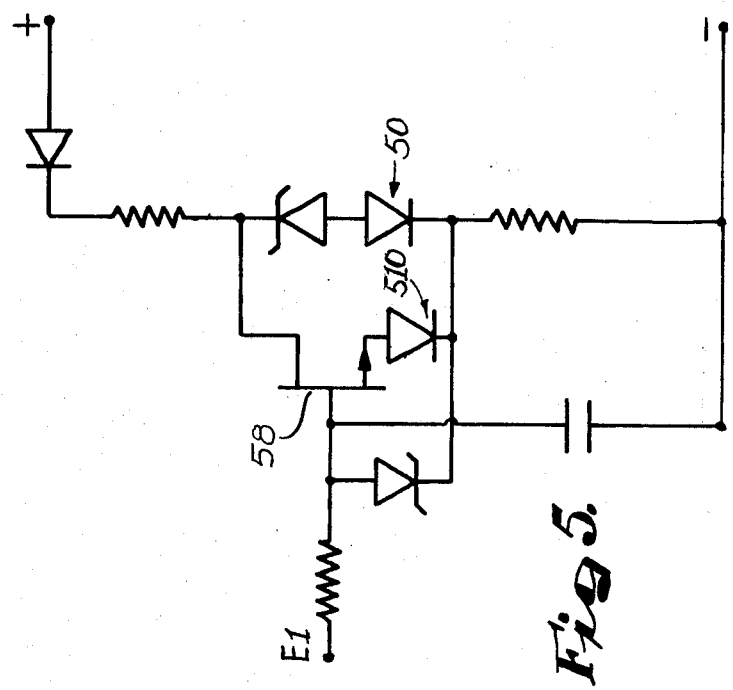

The conductors 2, 3 referred to above are connected from the station battery 1 of the system to be monitored to the positive and negative rails respectively of the detector. FIG. 2 is the circuit diagram of a series regulator connected between the positive and negative rails.

The series regulator comprises a pair of resistors 60, 61 connected in series with a pair of diodes 62, 63 between the positive and negative rails. The diodes 62, 63 are connected in parallel with a transistor 64 to form a constant current source. The collector of the transistor 64 is connected to a Zener diode 65 to bias the latter via a resistor 66. The Zener diode is connected to the base of a second transistor 67 which is adapted to provide a constant voltage at a terminal B of a predetermined value less then the station battery voltage. If an a.c. supply were used instead of the station battery 1, a diode 68 and capacitor 69 may be connected in series with the resistor 60 between the rails to provide half-wave rectification.

Figure 3:
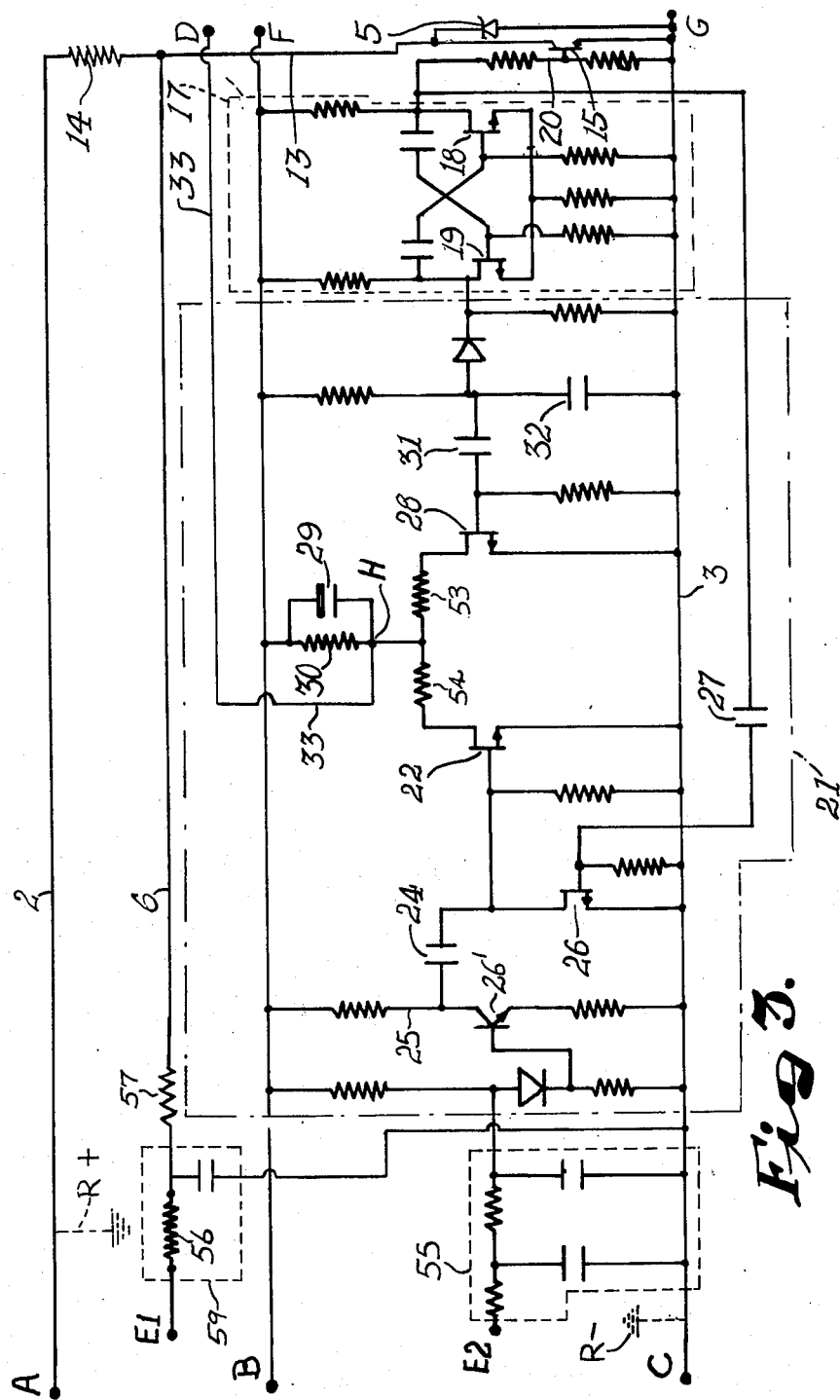

FIG. 3 is the circuit diagram of a switching and voltage detective circuit. A conductor 13 is connected between the positive and negative rails. The conductor 13 includes a resistor 14 and a switching transistor 15. A zener diode 5 is connected in parallel with the switching transistor 15. The latter is to be switched on and off alternately to perform the function of the switch 4 described above.

Switching of the transistor 16 is effected by a multivibrator 17 connected between the terminal B rail and the negative rail. The multi-vibrator 17 is a well known device and operates to switch two field effect transistors 18, 19 on and off alternately. The drain of field effect transistor 18 is connected to the base of transistor 15 by means of a voltage divider 20. Thus, when the field effect transistor 18 is switched on, the base voltage of the switching transistor 15 diminishes to switch it off. Similarly, when the field effect transistor 18 is switched off, the base voltage of the switching transistor 15 rises to switch it on.

A first chassis ground terminal E1 is connected to the conductor 13 by means of a conductor 6. A second chassis ground terminal E2 is connected to a voltage detective circuit 21 through a filter 55. The detective circuit is connected between the terminal B rail and the negative rail and serves to detect, with respect to the negative rail, the potential difference between the chassis ground and the negative rail.

The detective circuit 21 includes a field effect transistor 22 connected as shown. The gate of the latter is connected to a capacitor 24 which is connected to a voltage divider 25. A transistor $26^1$ in the voltage divider 25 serves as an amplifier. The capacitor 24 is connected to the negative rail through a field effect transistor 26. The gate of the latter is connected through a capacitor 27 to the drain of field effect transistor 18. The drain of field effect transistor 22 is connected to that of an identical transistor 28. Transistors 22, 28 are connected in parallel to a resistor 30 as shown.

Assume firstly that in the multi-vibrator 17 field effect transistor 18 switches off and field effect transistor 19 switches on. The high potential on the drain of field effect transistor 18 switches transistor 15 on via potential divider 20. Hence, provided there is no ground leak, the potential difference between the ground terminal E1 and the negative rail will be nearly nil. Ground terminals E1, E2 are linked via the system chassis ground and therefore ground terminal E2 will be at the same low potential with respect to the negative rail. This will cause the base potential of transistor $26^1$ to drop in accordance with the time constant of filter 55. The potential on the collector of transistor $26^1$ will thus rise in sympathy.

When the drain potential of field effect transistor 18 rises, this potential change is reflected on the gate of field effect transistor 26, via capacitor 27. The latter switches field effect transistor 26 on which in turn switches field effect transistor 22 on. As the collector potential of transistor $26^1$ rises, capacitor 24 charges up via field effect transistor 26.

The low potential on the drain of field effect transistor 19 is reflected at the gate of field effect transistor 28, switching if off. Thus field effect transistor 22 will be on whilst field effect transistor 28 is off. Point H in the detective circuit 21 thus acquires a potential due to the potential divider formed by resistors 30 and 54 and field effect transistor 22.

When the multi-vibrator changes state, field effect transistor 18 switches on, transistor 15 switches off, and the potential difference between the ground terminals E1, E2 and the negative rail is determined by the Zener diode 5. As before, this potential rise is filtered via filter 55 and amplified via transistor $26^1$, so that the collector voltage of the latter begins to drop. Also, when field effect transistor 18 switches on, field effect transistor 26 is switched off via capacitor 27. The falling potential on the collector of transistor $26^1$ is now reflected at the gate of field effect transistor 22 via capacitor 24, causing it to switch off.

Simultaneously field effect transistor 19 has switched off, so that field effect transistor 28 is switched on via capacitors 31, 32.

As before, the potential at point H acquires a predetermined value due to the potential divider formed by resistors 30 and 53 and field effect transistor 28.

Thus, with no ground faults present, field effect transistors 22 and 28 switch on and off alternately. Capacitor 29 acts as a reservoir during switching transients, so as to maintain the potential at point H practically constant.

If a ground fault occurs on the negative side of the system being monitored (indicated as R— in FIG. 3 for ease of reference) a resistor is in effect connected between ground terminals E1, E2 and the negative rail. Thus, when transistor 15 switches off, the potential of ground terminals E1, E2 will no longer rise to the Zener diode 5 voltage, but to some lower potential due to the divider formed by the resistors 56, 57 and the fault resistance in parallel with the Zener diode 5. Thus both field effect transistors 22, 28 will be on for a part of the cycle, reducing the average potential of point H with respect to the negative rail.

If a ground fault occurs on the positive side of the system (indicated as R+ in FIG. 3 for ease of reference) a resistor will in effect be connected between the positive rail and the ground terminals E1, E2. Thus, when transistor 15 switches on, a potential divider consisting of the fault resistance and resistors 56, 57 is formed between the positive and negative rails. As a result, the potential of ground terminals E1, E2 will no longer fall to nil when the transistor 15 is on and the average potential of point H is reduced as described above.

Figure 4:
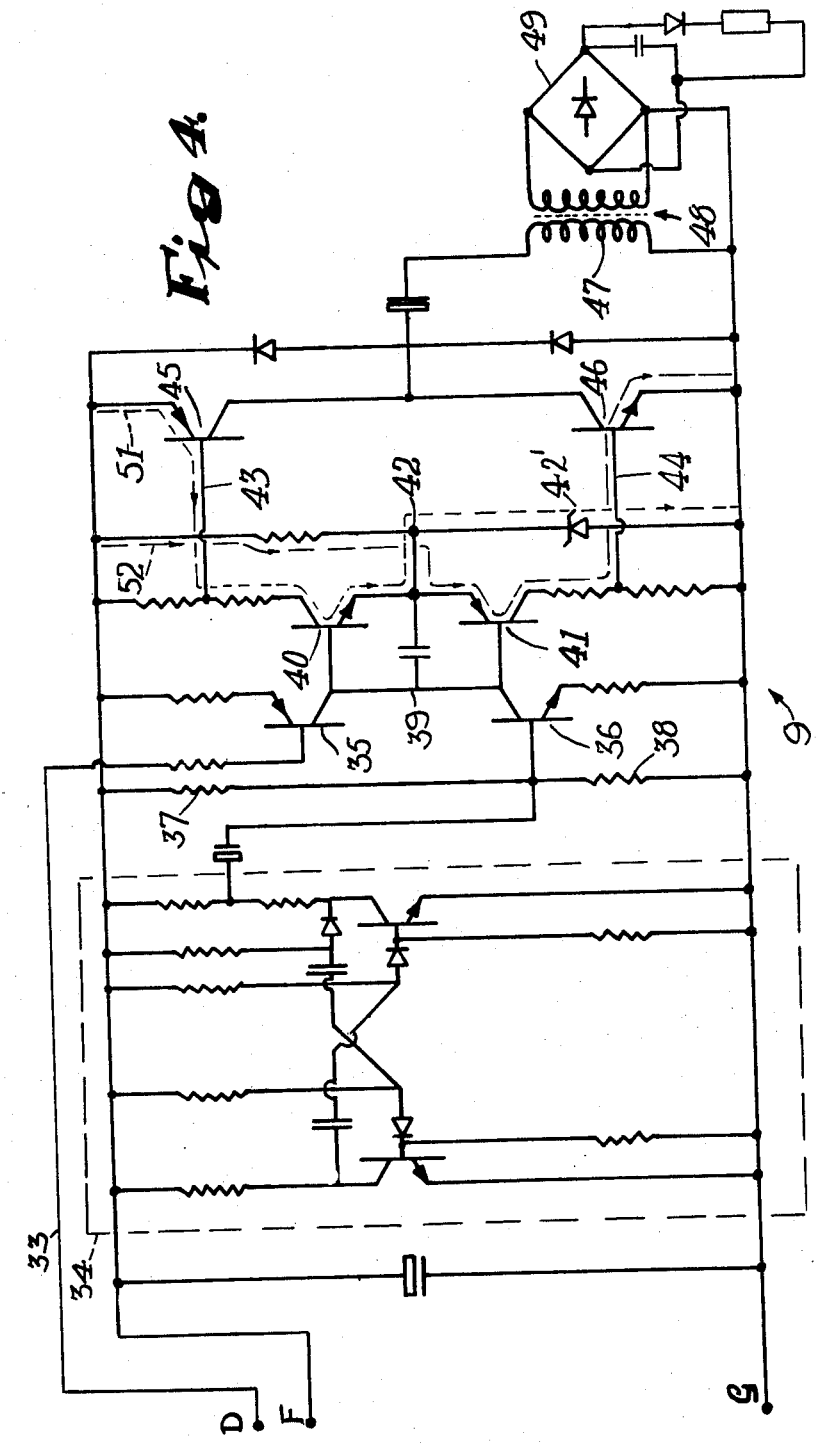

A conductor 33 connects point H to a voltage level detector which monitors the potential of point H. The voltage level detector is shown in FIG. 4 and includes a multi-vibrator 34 similar to the multi-vibrator 17 described above. Two transistors 35, 36 of opposite polarity are connected in series between the terminal B rail and the negative rail. The conductor 33 is connected to the base of transistor 35. One side of the multivibrator 34 is connected to the base of transistor 36 and thereby provides means for applying an a.c. potential on the base of transistor 36. This a.c. potential is superimposed on a d.c. potential also applied to the base of transistor 36 such that the emitter current of transistor 36 will vary about the emitter current of transistor 35 to an extent equivalent to a predetermined variation of the emitter current caused by an acceptable variation of the d.c. signal in the conductor 33. Means for applying this d.c. potential may conveniently be a pair of resistors 37, 38 connected in series across the rails and in parallel to the base of transistor 36. The pair of transistors 35, 36 forms voltage to current convertors to regulate current along a conductor 39 in accordance with the applied voltages described above.

The collectors of transistors 35, 36 are connected together and to the bases of two similar transistors 40, 41 of reversed opposite polarity in series and connected between the rails described above. The transistors 40, 41 have their emitters connected together and taken to a reference terminal 42. The potential of the reference terminal is provided by a Zener diode $42^1$ as shown. The collectors of transistors 40, 41 are connected to provide input conductors 43, 44 of a summing network which requires both inputs to provide a single output from the network. The latter can conveniently comprise a pair of transistors 45, 46 of opposite polarity in series and connected between the rails. The collectors of transistors 45, 46 are connected together and a.c. coupled to the primary winding 47 of transformer 48. The secondary winding of the latter is connected to a rectifying bridge 49. The latter is connected to a relay 10.

In use, the resistors 37, 38 are chosen so that the emitter current of transistor 36 is equal to the emitter current of transistor 35 when the d.c. signal in conductor 33 is at a particular value. The a.c. potential from the multi-vibrator 34 is chosen to cause the emitter current of transistor 36 to vary on each side of the emitter current of transistor 35 to an extent equivalent to the variation of emitter current of transistor 35 caused by an acceptable variation of the d.c. signal imposed on the base of transistor 35.

Thus, if the d.c. signal from the voltage detective circuit 21 remains constant the transistors 40, 41 will be switched on and off alternately. This is due to the a.c. potential on the base of transistor 36 changing the latter's emitter current so that current is passed alternately through transisors 40, 41.

The switching of the transistors 40, 41 gives rise to current flow along paths 51, 52 alternately which results in transistors 45, 46 being switched on and off alternately. This gives rise to an alternating current through the primary winding 47 of the transformer 48 which enables power from the rectifying bridge 49 to be applied to the relay 10 to hold it up.

The reference potential at terminal 42 ensures that transistors 40, 41 can be switched as described above.

Should, however, the d.c. signal from the voltage detective circuit 21 vary either up or down causing the emitter current of transistor 35 to approach either peak value of the emitter current of transistor 36, it will not be possible for transistors 40, 41 to switch on and off as above described. Depending on which way the current varies, one or other of transistors 40, 41 must be permanently off. This causes one of the signals of the summing network to disappear and thus prevents the appearance of an alternating current through the winding 47 and thus the relay 10 will drop.

When the relay 10 drops, the station battery 1 will usually be disconnected automatically from the system which it supplies. When this happens the station battery may be connected automatically to the indicating circuit shown in FIG. 5. The indicating circuit includes two light emitting diodes 50, 51 and a field effect transistor 58.

When a fault occurs on the positive side the field effect transistor 58 will conduct, by-passing current from diode 50 and causing diode 51 to light up.

When a fault occurs on the negative side, the field effect transistor 58 will be switched off, diode 51 will be extinguished and diode 50 will light up.

When faults occur on both sides, either diode 50 or 51 will be lit, depending on which side the fault predominates.

The ground fault detector described above is used for monitoring ground faults in floating electrical systems having d.c supplies. However, it will be understood that a detector using the principle of the invention may also be used for systems having a.c. supplies.

It is pointed out that the detector described above will not fail in the presence of disturbances applied to the system such as induced voltages from lighting surges. This is achieved by using a multi-vibrator 17 with a suitable frequency and a filter 55 with suitable time-constant and attenuation characteristics.

For the same reason, the system will tolerate the sudden application of loads connected through long lengths of cable such as those in d.c. points machines, having high capacitance to ground.

A filter network 59 (FIG. 3) ensures that the detector will tolerate large a.c. voltages between either rail and chassis ground.

The detector described above utilizes the battery 1 of the system being monitored to impress a varying voltage on the chassis ground as described.

Figure 6:
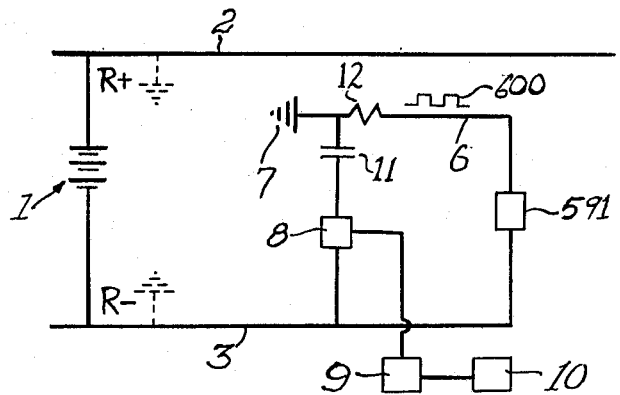

It is possible to use a separate source for this purpose. In FIG. 6 such a source is shown in the form of an a.c. generator 59. The latter injects a low-frequency square wave into the chassis ground terminal 7 as indicated by the wave form 60. The generator 59 thus takes the place of the switch 4 and Zener diode 5 of FIG. 1 and the detector functions in the same way as that of FIG. 1.

What I claim as new and desire to secure by Letters Patent is:

1. A method of detecting ground faults in ungrounded equipment having an electrical supply, the method comprising the steps of;
    connecting either side of the supply to a chassis ground terminal of the equipment;

impressing a voltage varying alternately between two predetermined values on the terminal relative to one side of the supply;

detecting and monitoring with respect to this side of the supply, the resulting potential between this side and the chassis ground, said potential varying between predetermined magnitudes in the absence of any ground leak; and monitoring said potential, ground faults in the equipment being detectable by a change in magnitude of said varying potential;

establishing ground faults by changes in the magnitude of the varying potential; and locating the faults with respect to the sides of the supply from variations to the upper and lower predetermined values.

2. A method as claimed in claim 1 in which a pedetermined value and substantially nil constitute the two values of voltages impressed on the chassis ground terminal.

3. Apparatus for detecting ground faults in ungrounded equipment including a chassis and having an electrical supply, the apparatus comprising:

a chassis ground terminal of the equipment connected to either side of the supply means for impressing a voltage variable alternately between two predetermined values on the terminal relative to one side of the supply;

a voltage detector connected to measure varying potential between said side and the chassis ground;

a monitor connected to the detector to indicate variations in the potential and a relay connected to the monitor connected to control the supply to the equipment.

4. Apparatus as claimed in claim 3 in which the means for impressing a voltage on the chassis ground terminal relative to one side of the supply comprises an a.c. generator connected between the ground terminal and said side of the supply, the a.c. generator being adapted to generate a low-frequency square wave signal, having a voltage variation between a predetermined value and substantially nil with respect to the chassis ground terminal.

5. Apparatus as claimed in claim 3 in which the supply is a d.c. supply, in which conductors are connected from the positive and negative sides of the d.c. supply to positive and negative rails respectively of the apparatus, in which a first conductor is connected between the positive and negative rails, the chassis ground terminal being connected to said first conductor, the means for impressing a voltage on the chassis ground terminal comprising means for creating a voltage drop in said first conductor between the chassis ground terminal and one of said rails, the means for varying the voltage alternately between two predetermined values comprising a switching means connected in the first conductor between the ground terminal and said one rail and means for switching the switching means on and off alternately.

6. Apparatus as claimed in claim 5 in which the switching means comprises a first transistor connected in the first conductor and in which the means for creating a voltage drop comprises a Zener diode connected in parallel with said first transistor.

7. Apparatus as claimed in claim 6 including a voltage regulator connected between the positive and negative rails and providing an intermediate rail at a constant voltage of a predetermined value less than the voltage of the supply, the means for switching the first transistor on and off alternately comprising a multivibrator connected between the intermediate and negative rails, the multi-vibrator being connected to the base of the first transistor.

8. Apparatus as claimed in claim 6 including a voltage regulator connected between the positive and negative rails and providing an intermediate rail at a constant voltage of a predetermined value less than the voltage of the supply, the means for detecting the potential between said one rail and the chassis ground comprising second and third field effect transistors connected in parallel to a common resistor between the intermediate and negative rails and means for switching the second and third transistors on and off alternately in unison with the first transistor, a constant potential thereby being provided at the junction of the drains of said second and third transistors in the absence of any ground faults in the equipment being monitored.

9. Apparatus as claimed in claim 8 including a d.c. voltage level detector for monitoring said constant potential, said d.c. voltage level detector comprising;

a first pair of transistors connected in series between the intermediate and negative rails, the collectors of the first pair of transistors being connected together;

a second pair of transistors connected in series between the intermediate and negative rails, the emitters of the second pair of transistors being connected together, the collectors of the first pair of transistors being connected separately to the bases of the second pair of transistors;

means for applying the said constant potential to the base of one transistor of the first pair of transistors;

means for applying a d.c. potential to the base of the other transistor of the first pair of transistors;

means for superimposing an a.c. potential on said d.c. potential so that the emitter current of the said other transistor will vary about the emitter current of the said one transistor to an extent equal to the variation of the emitter current of the said one transistor caused by an acceptable variation of the said constant potential, the emitters of the second pair of transistors being connected to a reference terminal adapted to be maintained at a reference potential, the collectors of the second pair of transistors being connected separately to a summing network, the latter requiring an input signal from both of the said collectors to give an output signal.

10. Apparatus as claimed in claim 9 in which the said summing network comprises a third pair of transistors connected in series between the intermediate and negative rails, the collectors of the second pair of transistors being connected together and to the primary winding of a transformer the secondary winding of the latter being connected to a rectifying bridge, the latter being connected to a relay.

11. Apparatus as claimed in claim 8 in which the means for applying a d.c. potential to the base of the said other transistor is a pair of resistors connected in series between the intermediate and negative rails and in parallel with the said base and in which the means for applying an a.c. potential superimposed on the d.c. potential is a multi-vibrator connected between the intermediate and negative rails and to the base of the said other transistor.

\* \* \* \* \*